United States Patent [19]

Xue et al.

[11] Patent Number: 5,595,642

[45] Date of Patent: Jan. 21, 1997

[54] PRESSURE LEACHING OF NICKEL AND COBALT SULPHIDES WITH CHLORINE UNDER CONTROLLED REDOX POTENTIAL CONDITIONS

[76] Inventors: Tao Xue, 43 Rondeau, Kirkland Quebec, Canada, H9H 3T1; Ronald R. Dunn, 1899 Cedarview Crescent, Sudbury Ontario, Canada, P3A 5L6

[21] Appl. No.: 558,530

[22] Filed: Nov. 16, 1995

[30] Foreign Application Priority Data

Dec. 1, 1994 [CA] Canada ................................. 2137124

[51] Int. Cl.⁶ .................................................. C25C 1/06
[52] U.S. Cl. ........................ 205/591; 205/589; 423/150.1
[58] Field of Search .................................... 205/591, 589, 205/590; 423/138, 139, 150.1, 150.5, 150.6, 150.4; 75/740, 743

[56] References Cited

U.S. PATENT DOCUMENTS

| | | | |
|---|---|---|---|
| 3,880,653 | 4/1975 | Hougen .................................. | 205/591 |
| 4,062,924 | 12/1977 | Glaum .................................. | 423/150.1 |
| 4,304,664 | 12/1981 | Victorovich et al. .................. | 210/172 |
| 4,377,410 | 3/1983 | Thomas ................................. | 75/419 |
| 4,828,809 | 5/1989 | Thomassen et al. ...................... | 423/39 |
| 4,927,794 | 5/1990 | Marcantonio ............................. | 502/26 |

FOREIGN PATENT DOCUMENTS

| | | |
|---|---|---|
| 1023560 | 1/1978 | Canada . |
| 1110456 | 10/1981 | Canada . |
| 1143573 | 3/1983 | Canada . |
| 2026967 | 4/1991 | Canada . |
| 0248518 | 12/1987 | European Pat. Off. . |

*Primary Examiner*—Kathryn Gorgos
*Assistant Examiner*—Brendan Mee
*Attorney, Agent, or Firm*—George J. Primak

[57] ABSTRACT

A method of pressure leaching nickel and cobalt from sulphidic precipitates is provided, wherein such precipitates are leached with chlorine at a controlled redox potential of between 400 and 550 mV (Ag/AgCl), catalysed by copper, and at a temperature of between 120° and 160° C., to dissolve at least 80% of cobalt and to oxidize less than 10% of sulphur to sulphate.

14 Claims, 2 Drawing Sheets

PRESSURE LEACHING OF NICKEL AND COBALT SULPHIDES WITH CHLORINE UNDER CONTROLLED REDOX POTENTIAL CONDITIONS

TECHNICAL FIELD

This invention relates to pressure leaching of nickel and cobalt sulphides with chlorine under controlled redox potential conditions. More particularly it relates to such pressure leaching of sulphidic precipitates in which millerite (NiS) is the main nickel compound and cobalt-millerite (CoS) is the main cobalt compound and wherein the copper content is low, normally less than 0.5%, while sulphur content is high, normally in the range of 30–40%; these precipitates are difficult to leach.

BACKGROUND OF THE INVENTION

Laterite ores are known to generally contain the oxides of nickel, cobalt, iron, aluminum, magnesium and silicon. Hydrometallurgical treatments of these ores include sulphuric acid and ammonia leaching. Sulphidic precipitates are then obtained by $H_2S$ precipitation from the pregnant leach solution containing mainly nickel and cobalt. In the precipitates, millerite (NiS) is the main nickel compound and cobalt-millerite (CoS) is the main cobalt compound. The sulphur content in the precipitates is high, about 30–40%.

Sulphidic matte is a pyrometallurgical product which is obtained by smelting sulphidic concentrates containing nickel, cobalt, copper, iron as well as other non-ferrous metals. The main nickel component in the matte is $Ni_3S_2$ and the sulphur content is about 17–25%. It is well known that sulphidic precipitates are significantly more difficult to leach than sulphidic mattes.

A chlorine leaching process at atmospheric pressure, such as disclosed in U.S. Pat. No. 3,880,653 of Apr. 29, 1975, has been found unsatisfactory for leaching sulphidic precipitates of the type mentioned above. Even when leaching under the best conditions set out in that patent, namely at a redox potential of 450 mV (S.C.E.), i.e. measured against a Saturated Calomel Electrode, and a temperature above 100° C. for 5–6 hours, only up to 80% of nickel and 40% of cobalt were dissolved. Increasing redox potential to 500 mV under atmospheric conditions provided little improvement in the dissolution of nickel and cobalt, but significantly increased the proportion of sulphur oxidized to sulphate, which is highly undesirable.

Thus, to increase the recovery of nickel and cobalt from sulphidic precipitates, a pyrometallurgical pre-treatment is normally required, such as roasting to make nickel and cobalt oxides prior to acid leaching, or smelting to produce nickel and cobalt matte, which removes sulphur and improves the leachibility of both metals during chlorine leaching. However, such pre-treatments substantially increase the capital and operating costs of the overall process.

In U.S. Pat. No. 4,828,809, pressure leaching of nickel- and copper-bearing sulphidic matte by chlorine is disclosed. There, the matte is leached in an autoclave at a temperature of 140°–150° C. and a pressure of 3–4 atmospheres (~45–60 psi). The redox potential is controlled at 310–320 mV (S.C.E.). This process was again found to be unsatisfactory for the sulphidic precipitates such as mentioned above, because it favoured dissolution of nickel over copper and did not produce sufficient dissolution of the cobalt. In fact the present applicants have tried many known leaching processes to leach the sulphidic precipitates mentioned above, and none gave a cobalt dissolution of more than 60%. Nickel dissolution was somewhat higher, but usually less than 80%. This is clearly unsatisfactory.

SUMMARY OF THE INVENTION

It is, therefore, an object of the present invention to provide a leaching method allowing high dissolution of nickel and cobalt from sulphides with a low oxidation of sulphur present in the slurry.

Another object of the invention is to provide a leaching method of sulphidic precipitates, such as mentioned above, without requiring a pyrometallurgical pre-treatment thereof, thereby significantly reducing the costs of the overall operation.

Other objects and advantages of the invention will become apparent from the following description thereof.

The present invention essentially provides a method of pressure leaching nickel and cobalt from sulphidic precipitates, which comprises charging an aqueous slurry of said sulphidic precipitates into a pressure vessel and leaching the same at over-atmospheric pressure with chlorine in the presence of copper as a redox catalyst at a controlled redox potential of a predetermined value of between 400 and 550 mV (Ag/AgCl), i.e. measured against an Ag/AgCl reference electrode, and a temperature of between 120° and 160° C., said predetermined redox potential and said temperature being such as to dissolve at least 80% of cobalt and to oxidize less than 10% of sulphur to sulphate during said pressure leaching, and said redox potential being controlled by continuously measuring the same within the pressure vessel using a suitable redox potential measuring probe and by continuously or intermittently injecting into the pressure vessel a required amount of chlorine to maintain said redox potential at the predetermined value until the leaching operation is essentially complete.

The sulphidic precipitates leached by the method of the present invention are particularly those which cannot be efficiently leached by conventional chlorine leaching processes without pyrometallurgical pre-treatment. They contain NiS, CoS and a small amount of Cu which is normally less than 0.5% by weight. Its nickel content is normally above 50% and the cobalt content is in the 5% range. An aqueous slurry of such precipitates is charged into the pressure vessel which is normally an autoclave made of titanium to withstand the corrosive effect of chlorine. The precipitate is usually slurried in the spent electrolyte or anolyte from nickel electrowinning which already contains dissolved nickel therein. The pulp density of the slurry is usually 15–40%. Its pH is normally that of the spent electrolyte, namely between 1 and 2. It is well known that at a pH higher than 3–4 nickel and cobalt will precipitate and thus the pH is maintained below these values. This can be readily accomplished by simply using the usual anolyte or spent electrolyte from the nickel electrowinning operation.

The over-atmospheric pressure maintained in the pressure vessel is usually only slightly higher than the vapour pressure which depends on the temperature used. The temperature is maintained at a desired level by means of a suitable heating device, e.g. a furnace. Thus a temperature of 130° C. produces a vapour pressure of around 40 psi (~2.7 atm.). Under such conditions the pressure maintained in the autoclave would be about 50 psi (~3.4 atm.) due to chlorine injection into the autoclave. The pressure is not necessarily stable or constant during the leaching operation and may vary to some extent.

Copper is used as the redox catalyst. It is used in sufficient amount to produce the catalytic effect. Copper is constantly reduced and oxidized during the leaching operation according to the following reactions:

$$2\ Cu^{2+} + NiS \rightarrow Ni^{2+} + 2\ Cu^+ + S°$$

$$2\ Cu^+ + Cl_2 \rightarrow 2\ Cu^{2+} + 2\ Cl^-$$

Normally the concentration of copper should be between about 5 g/l and 25 g/l. If sufficient copper is present in the original precipitate, it may not be necessary to add it. However, since this type of precipitate normally contains very little copper, some of it is usually added to catalyse the reaction. In fact, for this purpose, copper removed from the leach solution at a later stage may be recycled to the pressure leach and thereby used as a redox catalyst.

The redox potential will have a predetermined value of between 400 and 550 mV (Ag/AgCl) i.e. measured against Ag/AgCl reference electrode. Obviously this redox potential may be somewhat different if measured against S.C.E. A suitable redox potential measuring probe will usually consist of a measuring electrode, for instance made of platinum, and a reference electrode for instance Ag/AgCl electrode or S.C.E. electrode. In the present case the applicants have used Ag/AgCl as the reference electrode. A satisfactory redox measuring probe for the purpose of the present invention is, for example, The Redox Fermprobe® of Broadley-James Corporation of Santa Ana, Calif.

The most suitable redox potential for a given sulphidic precipitate may be determined by experimentation. It will be such as to produce a satisfactory dissolution of nickel and cobalt while producing only a minimum oxidation of sulphur present in the vessel. Normally under the same leaching conditions, nickel will dissolve to a higher degree than cobalt and consequently the applicants have determined as the minimum desirable dissolution of cobalt to be at least 80% and preferably over 90%, which will lead to even higher dissolution of nickel. Such dissolution will occur at a certain redox potential of between 400 and 550 mV (Ag/AgCl), when leaching at over-atmosphere pressure and at a temperature of between 120° and 160° C. At higher redox potentials and higher temperatures, more Ni and Co will be dissolved, but also more sulphur will be oxidized to sulphate. This latter oxidation should, however, be minimized as much as possible and, in any event, maintained below 10%, preferably 2–6%.

Thus, through experimentation, one can reach the most desirable combination of redox potential and temperature to achieve a satisfactory Ni and Co dissolution and low sulphur oxidation. Most preferably the redox potential is maintained between 450 and 500 mV (Ag/AgCl) and the temperature between 130° and 150° C.

The redox potential is maintained at a constant predetermined value by continuously measuring the same within the pressure vessel or autoclave using a measuring probe and a suitable meter with a millivolt scale and by continuously maintaining it at the predetermined value by injection into the autoclave of a required amount of chlorine to keep the redox potential at the pre-selected value. In an industrial operation, this control may be done by a computer. The redox potential is so maintained until the leaching operation is essentially complete. This occurs when the redox potential becomes stable and requires no further addition of chlorine to maintain it at the pre-selected value. This essentially signifies that the reaction is complete and, in the case of the present invention, usually occurs in less than two hours.

The nickel and cobalt dissolved in the leach solution using the pressure leaching method of the present invention can then be further processed and recovered by conventional methods, such as solution purification and electrowinning, to produce pure nickel and cobalt metals. The elemental sulphur is recovered from the leach residue.

BRIEF DESCRIPTION OF THE DRAWINGS

The invention will now be described with reference to the appended drawings, in which.

DETAILED DESCRIPTION OF THE INVENTION

Figure 1:
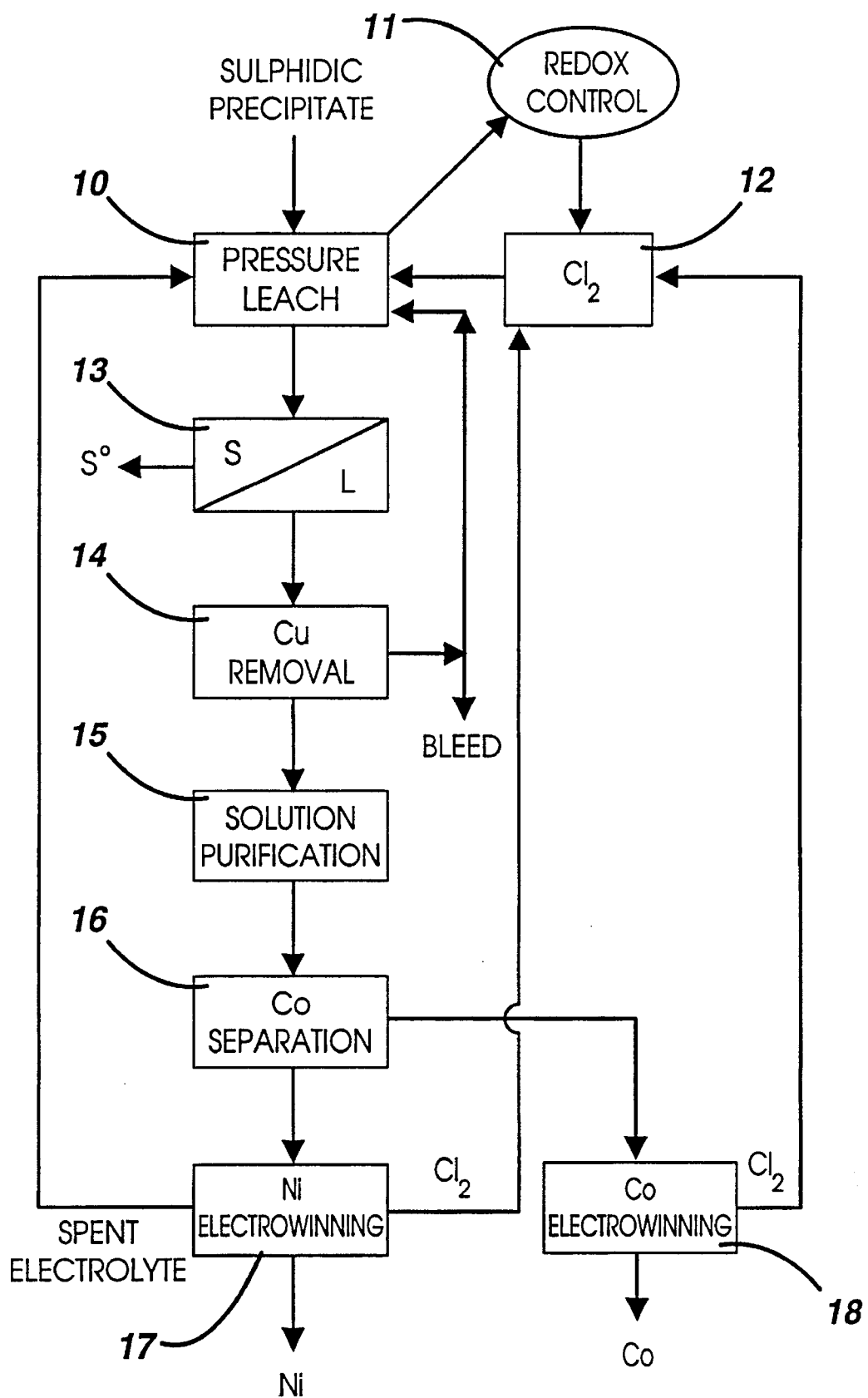
FIG. 1, is a schematic flow diagram of an embodiment of a process using the pressure leach of the present invention.

Referring to FIG. 1, it illustrates the pressure leach 10 of the present invention used in association with other steps of the overall process. Thus, the sulphidic precipitate, such as already mentioned above, is subjected to the pressure leach 10 where the redox potential is controlled at 11 and is maintained at a predetermined value of between 400 and 550 mV, measured against Ag/AgCl, by injection of $Cl_2$ at 12. The temperature in this pressure leach is maintained at between 120° and 160° C. It should be noted that 119° C. is the melting point of sulphur, and the temperature should be above this value. On the other hand, at too high a temperature sulphur may become very viscous and thus difficult to handle. This is the reason why the above range is used.

The sulphidic precipitate is slurried with spent electrolyte coming from the electrowinning operation 17, which already contains Ni dissolved therein.

After the pressure leach is completed, a solid-liquid separation is carried out at 13 where the solids represent the residue from which sulphur is recovered and liquid represents the pregnant solution which first goes to a step 14 of copper removal. The obtained copper can be recycled to the pressure leach 10 as redox catalyst, if required.

Then, after copper removal, the Ni-Co containing solution is purified at 15 by removal of other impurities, such as iron, zinc, etc, and then cobalt separation 16 is carried out by solvent extraction followed by electrowinning 17 and 18 to produce pure nickel and cobalt deposits respectively. As already previously mentioned, the spent electrolyte from Ni electrowinning, which has a pH of 1–2, can be used to slurry the sulphidic precipitates for pressure leach 10. The chlorine gas generated from Ni and Co electrowinning can also be used for pressure leach 10.

Figure 2:
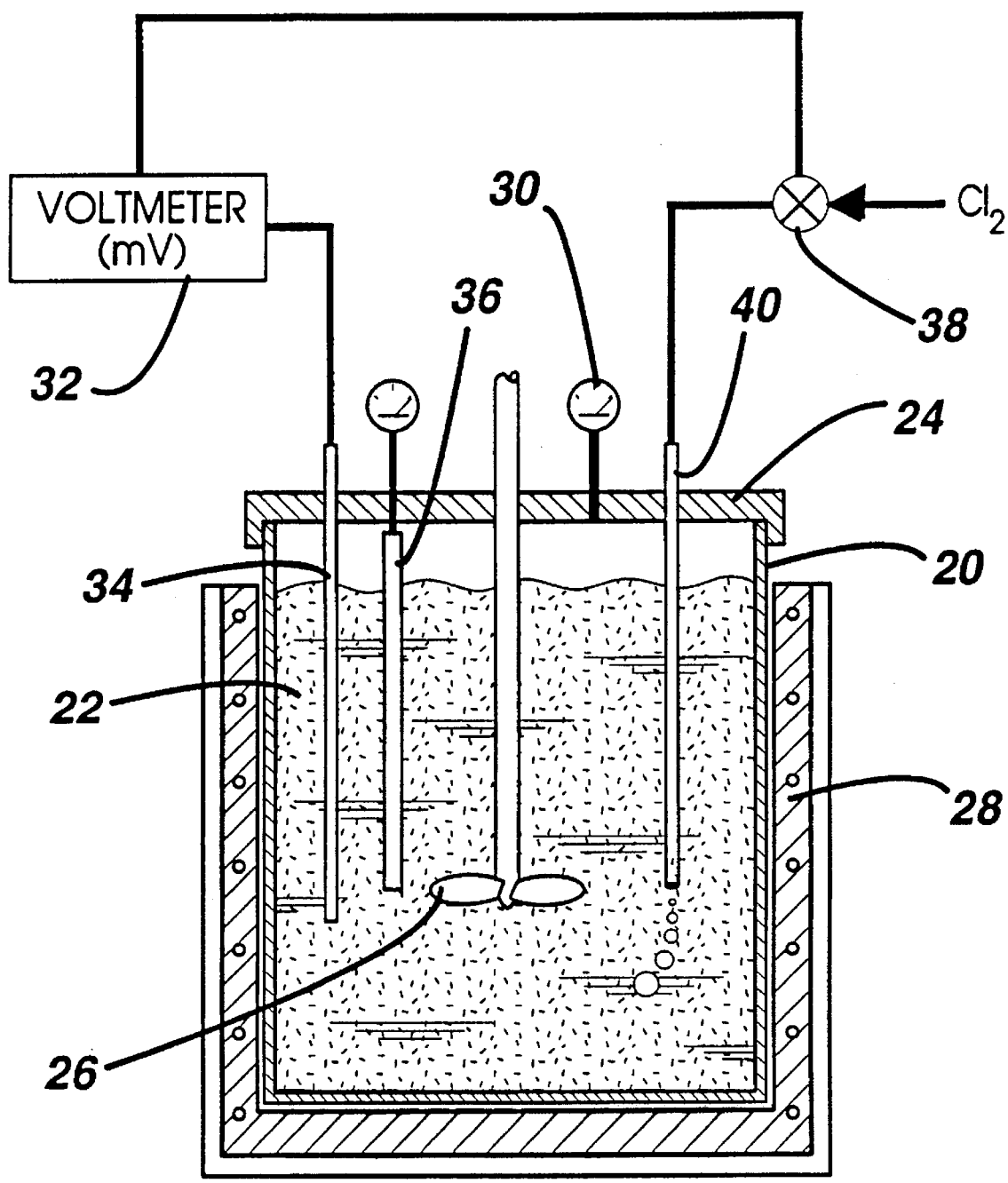
FIG. 2, is a schematic illustration of an experimental pressure vessel used for the pressure leach of the present invention.

FIG. 2 illustrates the controls performed within the pressure leach operation 10 of FIG. 1, which is carried out in a pressure vessel or autoclave 20 into which the slurry 22 of the sulphidic precipitate is charged and which is then hermetically closed by cover 24. The vessel which is usually a titanium autoclave has an agitator 26 to keep the solids dispersed in the leach solution. A furnace 28 is also provided to heat the autoclave and maintain the slurry inside it at a predetermined temperature of between 120°–160° C. which is measured by thermocouple 36. The pressure is measured by a pressure gauge 30 and is usually in the range of 25–90 psi (~1.7–6.0 atm.).

Redox potential is measured using a mV measuring meter 32, such as a pH meter set to the millivolt scale. A combined electrode or probe 34, which comprises a platinum electrode and an Ag/AgCl reference electrode is used to measure the potential and the signals are then used to control valve 38 for injecting chlorine through tube 40 in sufficient amount to maintain the redox potential at the desired value. This allows a very accurate control of the redox potential in the autoclave. In a commercial operation, the pressure leach could be carried out on a continuous basis with a computer control of the redox potential. It should, of course, be mentioned that slurry 22 also contains copper in sufficient amount to catalyse the leading operation. The copper concentration in solution is, however, significantly lower than in conventional chlorine leaching methods where it can often reach up to 50 g/l. In accordance with the present invention it will usually be in the 5–25 g/l range.

The following example further illustrates the present invention:

EXAMPLE

The nickel and cobalt sulphides produced by hydrometallurgical processing and used to illustrate the method of the present invention within this non-limitative example had the following composition:

TABLE 1

| Composition of nickel and cobalt suphides (%) | | | | | | | |
|---|---|---|---|---|---|---|---|
| Ni | Cu | Co | Fe | S | Zn | Cr | $SiO_2$ |
| 54.7 | 0.2 | 5.0 | 0.4 | 35.1 | 1.1 | 0.2 | 0.5 |

The leaching tests were carried out in a 2 liter titanium autoclave. Typically, 250 g nickel and cobalt sulphide (containing about 17% by weight of water) were leached with chlorine for 2 hours in 1.6 liters of aqueous solution, which is generally an anolyte from nickel electrowinning containing about 30 g/l Ni, and variable concentrations of copper and balanced amounts of chloride ions (initial pH 1.5). The redox potential inside the autoclave was measured in situ, with respect to an Ag/AgCl reference electrode and controlled by adding chlorine gas when necessary as already previously described. The pressure measured during leaching was in the range of 25–60 psi (~1.7–4.0 atm.), depending on the temperature. The results of the tests are summarized in Table 2. It should be noted that the oxidation of sulphur to sulphate was deduced from a sulphate balance.

TABLE 2

| Chlorine leaching of nickel and cobalt suphides | | | | | |
|---|---|---|---|---|---|
| Test | Temp (°C.) | In situ Redox (mV) | Copper (g/l) | Extraction % | | |
| | | | | Nickel | Cobalt | Sulphur |
| 1 | 130 | 420 | 19.8 | 88.8 | 80.3 | 4.8 |
| 2 | 130 | 450 | 19.8 | 97.9 | 96.3 | 4.7 |
| 3 | 130 | 500 | 19.8 | 93.4 | 92.6 | 6.7 |
| 4 | 115 | 450 | 19.8 | 85.8 | 77.8 | 5.8 |
| 5* | 130 | 450 | 21.1 | 99.2 | 98.2 | 2.8 |
| 6 | 130 | 450 | 0.0 | 55.1 | 52.5 | 6.7 |
| 7 | 130 | 450 | 5.2 | 94.0 | 93.1 | 6.3 |
| 8 | 140 | 450 | 19.8 | 98.1 | 96.8 | 5.1 |

*In this case 450 g sulphide was used in 1.6 litres of solution

As can be seen from tests 1–3, an increase in the redox potential from 420 to 450 mV (Ag/AgCl) significantly improved the extraction of both nickel and cobalt. A further increase of the redox potential to 500 mV, however, slightly decreased the extraction. Further, the sulphur oxidation, was similar at redox potentials of 420 and 450 mV (4.8%), but was substantially higher at a redox potential of 500 mV (6.7%), although still within an acceptable limit.

Temperature has a critical effect on pressure leaching. Temperatures below 120° C. resulted in an unsatisfactory reaction rate, based on the consumption of chlorine (Test 4). The resulting solubilities of nickel and cobalt were significantly lower than obtained at 130° C. Since the melting point of sulphur is 119° C., the leaching reactions occurring in the autoclave appear to be favoured by the state change of sulphur at temperatures above 120° C.

Increasing the temperature from 130° C. to 140° C. (Tests 2 and 8) resulted in similar nickel and cobalt solubilities and sulphur oxidation.

In Test 5, a higher pulp density (450 g vs. 250 g solids) was used while the other experimental conditions were similar to those of Test 2. Higher nickel and cobalt dissolution combined with less sulphur oxidation were obtained, which indicated that increasing pulp density had a positive effect on pressure leaching.

The effect of copper catalyst on pressure leaching can be seen from Tests 2, 6 and 7. When a solution without copper was used, as in Test 6, the redox potential was unstable and the corresponding nickel and cobalt solubilities were drastically diminished. The addition of about 5 g/l of copper (Test 7) eliminated the fluctuation of redox potential measured during leaching and significantly increased the dissolution of nickel and cobalt. A further increase to about 20 g/l of copper (Test 2) slightly enhanced the solubilities of both nickel and cobalt.

While the invention has been described with reference to some preferred embodiments thereof, it will be understood that obvious modifications, variations or adaptations can be made therein by those skilled in the art without departing from the essence of the invention or the scope of the appended claims.

We claim:

1. A method of pressure leaching nickel and cobalt from sulphidic precipitates which contain NiS as the main nickel compound, CoS as the main cobalt compound, have a low copper content of less than 0.5 wt % and a high sulphur content in the range of 30–40 wt %, which method comprises charging an aqueous slurry of said sulphidic precipitates into a pressure vessel and leaching the same at overatmospheric pressure with chlorine in the presence of copper as redox catalyst at a controlled redox potential of a value selected between 400 and 550 mV with respect to Ag/AgCl reference electrode and at a temperature of between 120° and 160° C., said redox potential and said temperature being such as to dissolve at least 80 wt % of cobalt and to oxidize less than 10 wt % of sulphur to sulphate during said pressure leaching and said redox potential being controlled by continuously measuring the same within the pressure vessel using a suitable redox potential measuring probe and by continuously or intermittently injecting into the pressure vessel a required amount of chlorine to maintain said redox potential at the selected value until the leaching operation is essentially complete.

2. Method according to claim 1, wherein said slurry is a slurry of the sulphidic precipitates in an anolyte which has a pH of between about 1 and 2.

3. Method according to claim 1, wherein said slurry has a pulp density of about 15–40%.

4. Method according to claim 1, wherein copper is present in a concentration of about 5–25 g/l.

5. Method according to claim 1, wherein the redox potential is between 450 and 500 mV with respect to Ag/AgCl reference electrode.

6. Method according to claim 1, wherein the temperature of the slurry is between 130° and 150° C.

7. Method according to claim 1, wherein the pressure in the pressure vessel is higher than the vapour pressure at a given temperature.

8. Method according to claim 7, wherein the pressure in the pressure vessel is 25–90 psi.

9. Method according to claim 1, wherein the redox potential and the temperature are controlled so as to dissolve at least 90 wt % of cobalt, over 90 wt % of Ni and to oxidize between 2 and 6 wt % of sulphur to sulphate.

10. Method according to claim 1, wherein the pressure vessel is a titanium autoclave.

11. Method according to claim 1, wherein upon completion of the pressure leaching operation, a liquid-solid separation is carried out to separate leach solution from leach residue and sulphur is recovered from the leach residue, while the leach solution is subjected to the steps of copper removal, solution purification, cobalt separation and electrowinning of nickel and cobalt respectively.

12. Method according to claim 11, wherein at least part of copper from the step of copper removal is recycled to the pressure leaching operation and used as the redox catalyst therein.

13. Method according to claim 11, wherein spent electrolyte from the electrowinning of nickel is recycled to the pressure leaching operation and used to form a slurry of the sulphidic precipitates.

14. Method according to claim 11, wherein chlorine gas generated from the electrowinning of nickel and/or cobalt is recycled to the pressure leaching operation and used as the chlorine reagent therein.

* * * * *